(12) United States Patent
Walters

(10) Patent No.: US 7,819,627 B2
(45) Date of Patent: Oct. 26, 2010

(54) AEROFOIL

(75) Inventor: Sean A Walters, Bristol (GB)

(73) Assignee: Rolls-Royce PLC, London (GB)

( * ) Notice: Subject to any disclaimer, the term of this patent is extended or adjusted under 35 U.S.C. 154(b) by 792 days.

(21) Appl. No.: 11/798,893

(22) Filed: May 17, 2007

(65) Prior Publication Data
US 2007/0297898 A1 Dec. 27, 2007

(30) Foreign Application Priority Data
Jun. 22, 2006 (GB) ................ 0612523.1

(51) Int. Cl.
*F01D 5/08* (2006.01)

(52) U.S. Cl. ............ 416/90 R; 416/229 R; 416/231 R; 416/232; 29/889.72

(58) Field of Classification Search ............ 416/90 R, 416/97 R, 226, 229 R, 231 R, 232; 29/889.72
See application file for complete search history.

(56) References Cited

U.S. PATENT DOCUMENTS

| | | | | |
|---|---|---|---|---|
| 3,085,632 A | * | 4/1963 | Schwegler | 416/219 R |
| 3,224,078 A | * | 12/1965 | Mayne | 29/889.4 |
| 3,457,619 A | * | 7/1969 | Kydd | 29/889.721 |
| 3,554,663 A | | 1/1971 | Helms | |
| 3,584,972 A | * | 6/1971 | Bratkovich et al. | 416/229 R |
| 3,610,769 A | * | 10/1971 | Schwedland et al. | 415/205 |
| 3,619,082 A | * | 11/1971 | Meginnis | 416/90 R |
| 3,698,834 A | * | 10/1972 | Meginnis | 416/96 R |
| 3,707,750 A | * | 1/1973 | Klass | 29/889.721 |
| 3,732,031 A | * | 5/1973 | Bowling et al. | 416/97 R |
| 6,022,191 A | * | 2/2000 | Moore et al. | 416/134 R |
| 6,129,257 A | * | 10/2000 | Xu et al. | 29/889.21 |

FOREIGN PATENT DOCUMENTS

| | | |
|---|---|---|
| GB | 619634 | 3/1949 |
| GB | 757502 | 9/1956 |
| GB | 853328 | 11/1960 |
| GB | 1 256 040 | 12/1971 |
| GB | 1 262 608 | 2/1972 |
| GB | 1 265 257 | 3/1972 |

* cited by examiner

Primary Examiner—Igor Kershteyn
(74) Attorney, Agent, or Firm—Oliff & Berridge, PLC

(57) ABSTRACT

An aerofoil made from a sheet metal blank which is bent in the shape of an aerofoil such that it has a leading edge, a trailing edge, a pressure side and a suction side, and the blank is joined at the trailing edge. The regions of the sheet metal blank that form the leading edge, trailing edge and pressure side of the aerofoil comprise a plurality of perforations. The suction side region of the sheet metal blank is imperforate.

24 Claims, 5 Drawing Sheets

AEROFOIL

This application claims priority to Great Britain 0612523.1 filed on Jun. 22, 2006, the entire disclosure of which is hereby incorporated by reference.

BACKGROUND

The invention relates to an aerofoil.

In particular the invention relates to an aerofoil made from a sheet metal blank for turbomachinery.

Aerofoils, such as nozzle guide vanes for turbomachinery, are frequently made by casting the required aerofoil shape from a suitable high temperature metal alloy. The overall cost of the resultant aerofoil is high as manufacture of such components demand extensive material and die preparation as well as post casting machining operations to complete the article, which result in a lengthy manufacturing process.

SUMMARY

As presented in GB 757502, it is known to manufacture blades for compressors and turbines by folding a piece of sheet metal and shaping the folds to provide the concave and convex surfaces of the blade before joining edges of the sheet together. This method of manufacture quickly produces a cheap blade which is suited to a low life and low performance application. However, this design makes no provision for cooling the blade material and hence it is unsuitable for high performance and/or extended life applications.

Therefore an aerofoil which can be produced cheaply and that can be used in high performance and/or extended life applications is highly desirable.

According to a first aspect of the present invention there is provided an aerofoil made from a sheet metal blank which is bent in the shape of an aerofoil such that it has a leading edge, a trailing edge, a pressure side and a suction side, and the blank is joined at the trailing edge wherein the sheet metal blank comprises a plurality of perforations, wherein the perforations are provided in the sheet metal blank that form the leading edge, trailing edge and pressure side regions of the aerofoil and the suction side region of the sheet metal blank is imperforate.

According to a second aspect of the present invention there is provided a method of manufacturing an aerofoil comprising the steps of:

i) cutting a blank from a metal sheet;

ii) providing a plurality of perforations in the sheet metal blank that form the leading edge, trailing edge and pressure side regions of the aerofoil;

iii) bending the blank into the shape of an aerofoil such that it has a leading edge, a trailing edge, a pressure side and a suction side; and iv) joining the blank at the trailing edge.

According to a third aspect of the present invention there is provided turbo machinery comprising a flow path defined by an inner casing and an outer casing, with at least one aerofoil provided in said flow path, wherein the or each aerofoil is made from a sheet metal blank which is bent in the shape of an aerofoil such that it has a leading edge, a trailing edge, a pressure side and a suction side, and the blank is joined at the trailing edge wherein the sheet metal blank comprises a plurality of perforations, wherein the perforations are provided in the sheet metal blank that form the leading edge, trailing edge and pressure side regions of the aerofoil and suction side region of the sheet metal blank is imperforate.

The invention solves the problem of the prior art by providing an aerofoil for a number of applications, including Nozzle Guide Vanes (NGV's), formed from sheet metal in which perforations are provided which, in use, facilitate cooling of the aerofoil.

Additionally since the aerofoil of the present invention is formed from a single layer of sheet metal, perforations can be provided in the metal blank prior to the forming of the aerofoil. This vastly simplifies the manufacturing process since difficulties in producing through holes on a curved surface of a hollow body without causing damage to internal and external surfaces of the aerofoil are completely avoided.

BRIEF DESCRIPTION OF THE DRAWINGS

The invention will now be described by way of example only, with reference to the accompanying drawings in which.

DETAILED DESCRIPTION OF EMBODIMENTS

Figure 1:
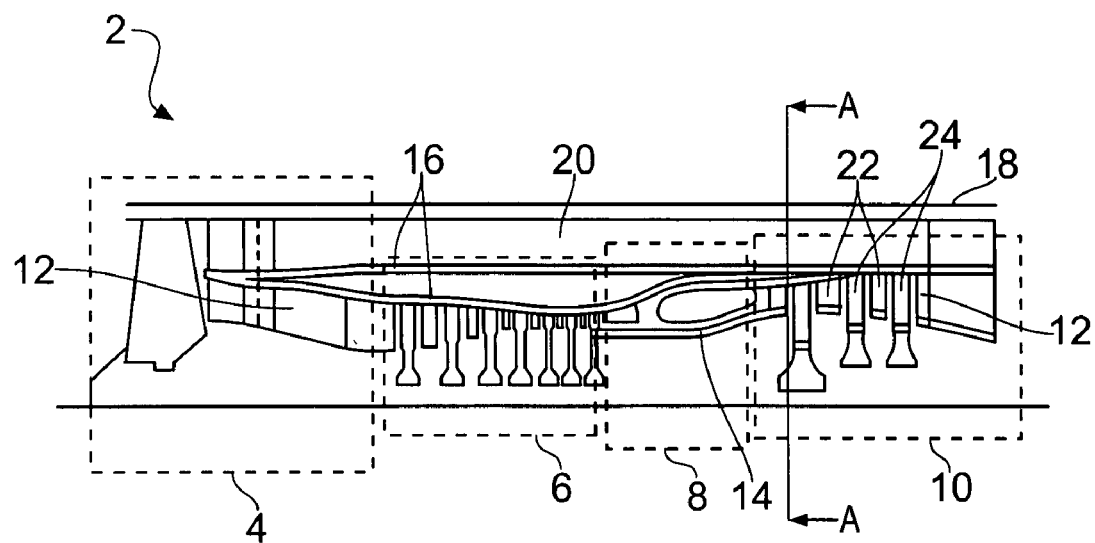
FIG. 1 shows a section of a gas turbine engine incorporating aerofoils according to the present invention.

Presented in FIG. 1 is a representation of a gas turbine engine 2. The overall construction and operation of the engine 2 is of a conventional kind, well known in the field and will not be described in this specification beyond that necessary to gain an understanding of the invention. Various details of the engine have been omitted from FIG. 1 for clarity. For the purposes of this description the engine is divided up into four parts, in flow relationship, namely a fan unit 4, a compressor section 6, a combustor section 8 and a turbine section 10.

The compressor 6, combustor 8 and turbine 10 define an engine core with a flow path 12 defined by an inner casing 14 and an outer casing 16. A further casing 18 is radially spaced apart from the outer casing 16 to define a bypass duct 20. The turbine section 10 forms part of the flow path 12, in which are provided rows of stator vanes 22 (nozzle guide vanes, NGV's) spaced between rows of rotor blades 24.

Figure 2:
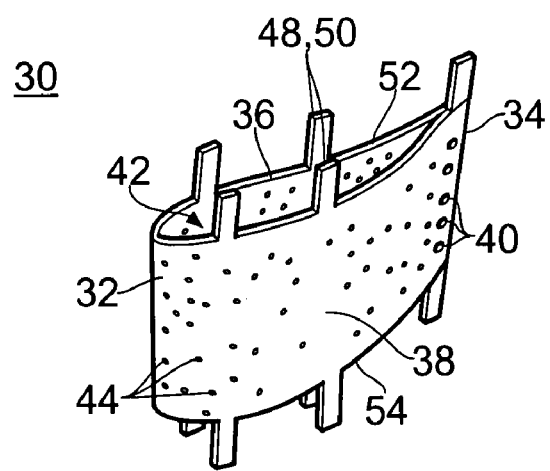
FIG. 2 presents a perspective view of an aerofoil according to the present invention.

FIG. 2 shows an aerofoil 30 for use as a nozzle guide vane 22. The aerofoil 30 is shown separate from the turbomachinery of FIG. 1. The aerofoil 30 comprises a leading edge 32, a trailing edge 34, a pressure side 36 and a suction side 38, and is joined at the trailing edge 34 by a number of spot welds 40 to form an internal cavity 42.

Alternatively the aerofoil 30 is joined at the trailing edge 34 by a seam weld. It may also be joined by riveting.

The wall of the aerofoil 30 is provided with a plurality of perforations (or "apertures") 44 which, in use, allow cooling air to pass from the internal cavity 42 through the wall of the aerofoil 30 in a cooling mechanism. Means for engagement 48 in the form of tabs 50 extend from the upper edge 52 and lower 54 edge of the aerofoil 30.

Figure 3:
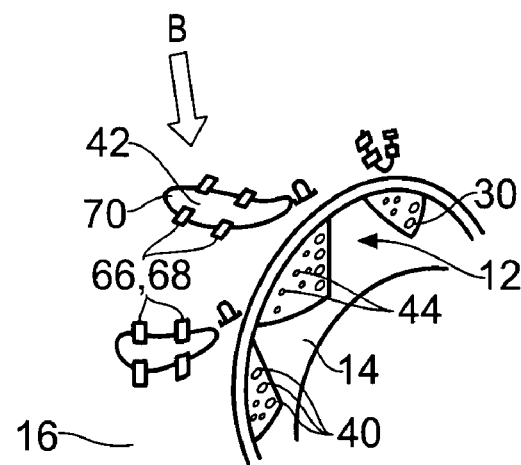
FIG. 3 shows a perspective view looking upstream at the trailing edges of an annular array of aerofoils in an annular casing according to the present invention, as viewed from line A-A in FIG. 1.

FIG. 3 shows a perspective view on section line A-A of FIG. 1 downstream of the combustor section 8. An annular array of aerofoils 30, in this case, the nozzle guide vanes (NGV's) 22, are provided in the flow path 12 defined by the inner casing 14 and the outer casing 16. Both the inner casing 14 and outer casing 16 are provided with engagement means 66 in the form of slots (or apertures) 68 for co-operation with the tabs 50 of the aerofoil 30.

Figure 4:
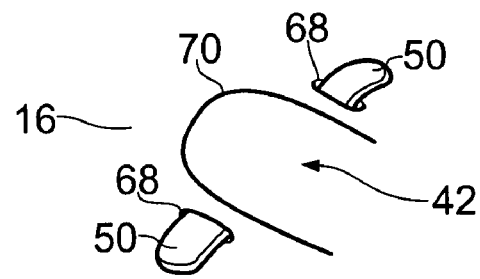
FIG. 4 shows co-operating means for engagement of the aerofoil and a casing as viewed from direction of arrow "B" in FIG. 3.
Figure 5:
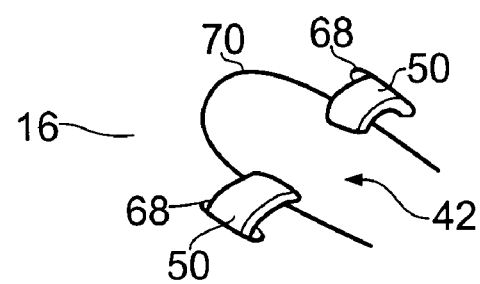
FIG. 5 shows an alternative means of engagement to that shown in FIG. 4.
Figure 6:
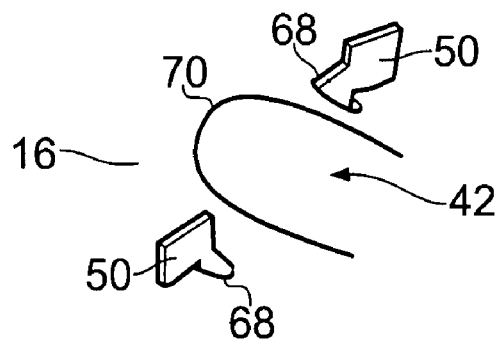
FIG. 6 shows a further alternative means of engagement to that shown in FIG. 4 or 5.

As shown more clearly in FIGS. 4, 5 and 6, and as viewed in the direction of arrow "B" in FIG. 3, the tabs 50 extend through the slots 68 such that the aerofoil 30 is fixed in place. The tabs 50 may be bent outwards (as shown in FIG. 4), inwards (as shown in FIG. 5) or twisted (as shown in FIG. 6) to prevent the tab 50 from passing back through the slot 68. The cavity 42 of the aerofoil is aligned with an aperture 60 in the casings 14,16 to permit a flow of cooling air through the aerofoil 30 and out through the perforations 44.

Figure 7:
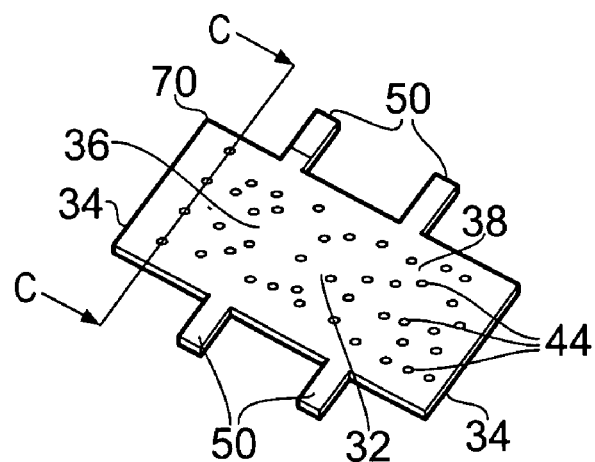
FIG. 7 shows an aerofoil sheet metal blank for forming an aerofoil according to the present invention.
Figure 8:
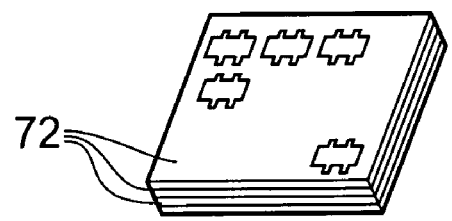
FIG. 8 shows a stack of metal sheets arranged for the cutting of sheet metal blanks for forming an aerofoil according to the present invention.

FIG. 7 shows a sheet metal blank 70 out of which the aerofoil 30 is formed. The blank 70 is cut from a flat metal sheet 72 and, as shown in FIG. 8, several blanks 70 may be cut from a stack of metal sheets 72 in one operation. The sheet metal blanks 70 may be cut from the metal sheet 72 by a laser cutting method. Alternatively the sheet metal blanks 70 may be stamped from the metal sheet 72.

Figure 11:
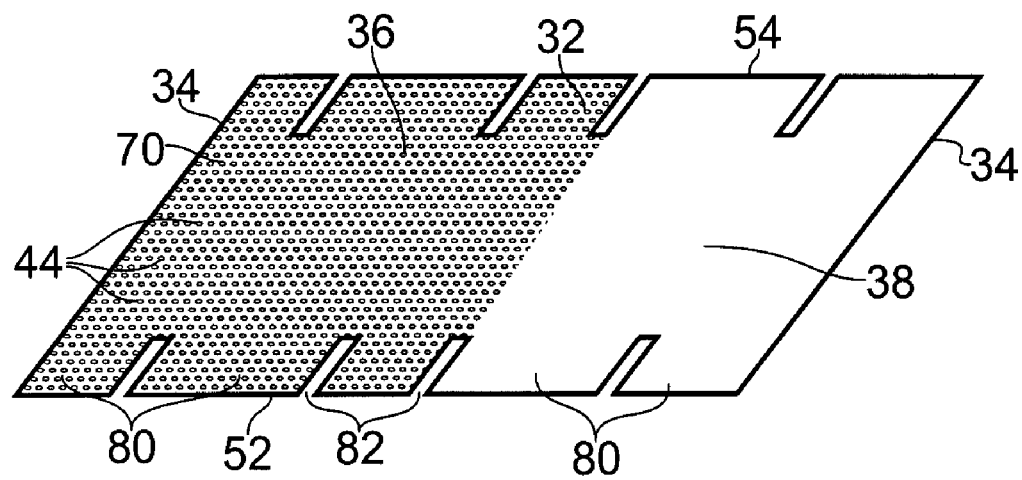
FIG. 11 shows an alternative sheet metal blank to that shown in FIG. 7 provided with tabs for the formation of flanges for engagement.

The required number of tabs 50 are cut from the sheet 72 as part of the sheet metal blank 70. Perforations 44 are drilled in the blank 70 prior to be being bent into shape of an aerofoil 30. As shown in FIG. 11, the perforations 44 may be laser drilled and may be circular or non circular in cross section. FIG. 7 shows perforations 44 distributed over the entire surface of the blank 70. The perforations 44 may also be provided in specific regions of the blank 70 for example in the regions which will form the leading edge 32, trailing edge 34 and the pressure side 36 whilst other regions (for example, the suction side 38) are imperforate. The perforations 44 may be spaced evenly. Additionally the spacing of the perforations 44 is chosen to provide a predetermined density of perforations 44 in a selected region or regions of the aerofoil 30. That is to say the density of the perforations 44 may be varied over the perforated regions as dictated by the expected cooling requirements in different regions of the aerofoil 30 in use.

Figure 9:
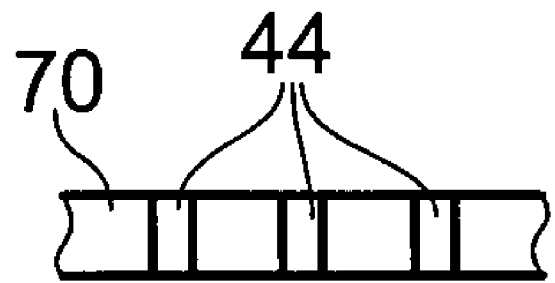
FIG. 9 shows a view through a perforated region of a sheet metal blank at section C-C of FIG. 7.
Figure 10:
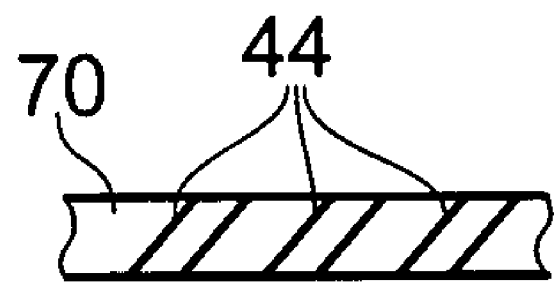
FIG. 10 shows an alternative view through a perforated region of a sheet metal blank at section C-C of FIG. 7 in which the cooling passages are angled.

FIGS. 9 and 10 present a cross sectional view of the blank 70 along a line of cooling holes 44 as identified by section line C-C in FIG. 7. The cooling holes 44 may be either perpendicular to the surface of the blank 70 as shown in FIG. 9 or at an angle to the surface of the blank 70 as shown in FIG. 10.

Figure 12:
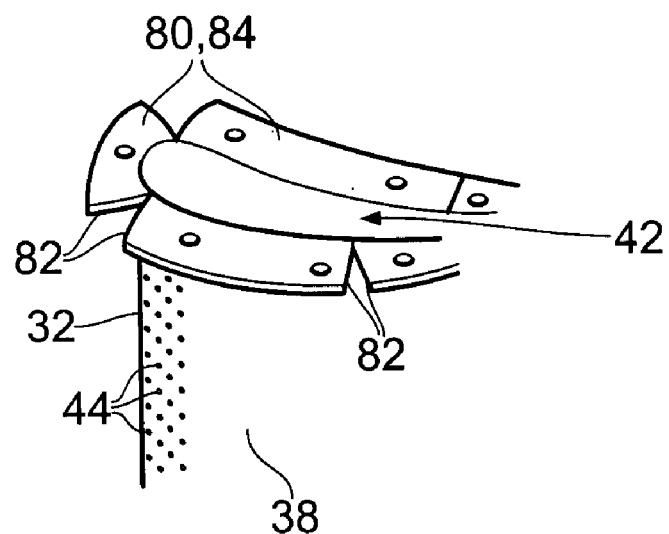
FIG. 12 shows the flange tabs of FIG. 11 bent to form a number of flanges for engagement.

Presented in FIG. 11 is blank 70 formed with an alternative means for engagement 48, provided as a number of flange tabs 80 on the edges 52,54 of the blank 70. As shown in FIG. 12, the flange 84 is formed by providing cuts 82 in the sheet metal blank 70 and then folding the flange tabs 80 back towards the aerofoil 30 surfaces to form the flange 84 for engagement with the inner casing 14 and the outer casing 16.

The flange tabs 80 may be formed into the flange 84 on either side of the casings 14,16. That is to say the flange 84 may be fixed to the casing 14,16 in the flow path 12 or bent into shape on the opposite side of the casing 14,16 to the flow path 12. The tabs 50 and flanges 84 may be welded or riveted to the casings 14,16. Suitable welding methods includes spot welding or seam welding.

The blank 70 is formed into an aerofoil 30 such that it has a leading edge 32, a trailing edge 34, a pressure side 36 and a suction side 38 by being bent around a forming tool, including a suitably shaped die. It is then joined at the trailing edge 34.

The use of sheet material lowers raw material costs beyond that achievable with casting alloys and significantly speeds up the manufacturing process. Also the use of simple fastening techniques as employed by the present invention eliminates the need for more expensive mounting means such as conventional vane platform fixing features and brazing.

The invention claimed is:

1. An aerofoil comprising:
a sheet metal blank having a first edge and a second edge, the sheet metal blank being bent to form an aerofoil such that the sheet metal blank has a leading edge, a trailing edge, a pressure side and a suction side, the first edge and the second edge being joined to form the trailing edge to define an interior of the aerofoil, wherein the sheet metal blank includes:
a plurality of perforations, the perforations being provided in the sheet metal blank that form the leading edge, a trailing edge region and a pressure side region of the aerofoil, wherein
the plurality of perforations extend through the sheet metal blank to the interior of the aerofoil, and the suction side region of the sheet metal blank is imperforate.

2. The aerofoil as claimed in claim 1, wherein the perforations are evenly distributed.

3. The aerofoil as claimed in claim 1, wherein the perforations are spaced apart from each other to provide a predetermined density of perforations in a selected region or regions of the aerofoil.

4. The aerofoil as claimed in claim 1, further comprising: a welded seam at the trailing edge.

5. The aerofoil as claimed in claim 4, further comprising: at least one spot weld at the trailing edge.

6. The aerofoil as claimed in claim 4, further comprising: a seam weld at the trailing edge.

7. The aerofoil as claimed in claim 1, further comprising: at least one rivet at the trailing edge.

8. The aerofoil as claimed in claim 1, wherein at least one edge of the sheet metal blank is provided with means for engagement with a casing.

9. The aerofoil as claimed in claim 8, wherein the means for engagement comprises a tab.

10. The aerofoil as claimed in claim 8, wherein the means for engagement comprises a flange extending from the at least one edge to provide an engagement surface.

11. A method of manufacturing an aerofoil comprising:
i) cutting a blank from a sheet of metal, the sheet metal blank having a first edge and a second edges;
ii) providing a plurality of perforations in the sheet metal blank;
iii) bending the sheet metal blank into a shape to form an aerofoil such that sheet metal blank has a leading edge, a trailing edge, a pressure side and a suction side; and
iv) joining the first edge and the second edge of the blank at the trailing edge to define an interior of the aerofoil, the plurality of perforations extending through the sheet metal blank to the interior of the aerofoil.

12. The method as claimed in claim 11, wherein the sheet metal blank is cut with at least one tab on at least one edge of the blank.

13. The method as claimed in claim 12, further comprising:
bending the at least one tab to provide a flange that extends at an angle to the surface of the blank and/or aerofoil thereby forming an engagement surface.

14. The method as claimed in claim 11, wherein the sheet metal blank is bent into the shape of an aerofoil around a forming tool.

15. The method as claimed in claim 11, wherein the sheet metal blank is pressed in a die to form an aerofoil shape.

16. A turbo machinery comprising:
a flow path defined by an inner casing and an outer casing, with at least one aerofoil provided in said flow path, wherein the at least one aerofoil is made from a sheet metal blank having a first edge and a second edge, the sheet metal blank being bent to form an aerofoil such that the sheet metal blank has a leading edge, a trailing edge, a pressure side and a suction side, the first edge and the second edge being joined to form the trailing edge and to define an interior of the aerofoil, wherein
the sheet metal blank includes
a plurality of perforations, the perforations being provided in the sheet metal blank that form the leading edge,
a trailing edge region and a pressure side region of the aerofoil, wherein the perforations extend through the metal sheet blank to the interior of the aerofoil, and the suction side region of the sheet metal blank is imperforate.

17. The turbo machinery as claimed in claim 16, wherein the perforations are evenly distributed.

18. The turbo machinery as claimed in claim 16, wherein the perforations are spaced apart from each other to provide a predetermined density of perforations in a selected region or regions of the aerofoil.

19. The turbo machinery as claimed in claim 16, wherein at least one edge of the blank includes means for engagement with the inner and/or outer casing, wherein the means for engagement is provided on the sheet metal blank.

20. The turbo machinery as claimed in claim 19, wherein the means for engagement comprises a tab.

21. The turbo machinery as claimed in claim 19, wherein the means for engagement comprises a flange extending from the at least one edge to provide an engagement surface.

22. The turbo machinery as claimed in claim 19, further comprising:
an engagement means on the inner and/or outer casing that cooperates with the means for engagement provided on the sheet metal blank such that the aerofoil is fixed in place.

23. The turbo machinery as claimed in claim 22, wherein the engagement means on the inner and/or outer casing is an aperture through which the means for engagement provided on the sheet metal blank extends.

24. The turbo machinery as claimed in claim 23, wherein the means for engagement provided on the sheet metal blank is bent and/or twisted on a through side of the aperture.

\* \* \* \* \*